US007028000B1

(12) United States Patent
Li

(10) Patent No.: US 7,028,000 B1
(45) Date of Patent: Apr. 11, 2006

(54) ESTIMATING BASE SALES VOLUME USING A LOW-PASS FILTER APPROACH

(75) Inventor: Yikang Li, Bridgewater, NJ (US)

(73) Assignee: i2 Technologies, Inc., Dallas, TX (US)

( * ) Notice: Subject to any disclaimer, the term of this patent is extended or adjusted under 35 U.S.C. 154(b) by 978 days.

(21) Appl. No.: 09/829,476

(22) Filed: Apr. 9, 2001

(51) Int. Cl.
G06F 17/60 (2006.01)

(52) U.S. Cl. ...................................................... 705/10

(58) Field of Classification Search ................... 705/10
See application file for complete search history.

(56) References Cited

U.S. PATENT DOCUMENTS

| | | | | | |
|---|---|---|---|---|---|
| 5,237,496 | A | * | 8/1993 | Kagami et al. | 705/10 |
| 5,237,498 | A | * | 8/1993 | Tenma et al. | 705/30 |
| 5,450,314 | A | * | 9/1995 | Kagami et al. | 706/46 |
| 5,758,328 | A | * | 5/1998 | Giovannoli | 705/26 |
| 5,765,143 | A | * | 6/1998 | Sheldon et al. | 705/28 |
| 5,933,813 | A | * | 8/1999 | Teicher et al. | 705/26 |
| 5,963,919 | A | * | 10/1999 | Brinkley et al. | 705/28 |
| 5,974,396 | A | * | 10/1999 | Anderson et al. | 705/10 |
| 5,983,224 | A | * | 11/1999 | Singh et al. | 707/6 |
| 6,006,196 | A | * | 12/1999 | Feigin et al. | 705/10 |
| 6,009,407 | A | * | 12/1999 | Garg | 705/10 |
| 6,341,269 | B1 | * | 1/2002 | Dulaney et al. | 705/22 |
| 6,839,682 | B1 | * | 1/2005 | Blume et al. | 705/10 |

FOREIGN PATENT DOCUMENTS

JP           2001084239   A   *   3/2001

OTHER PUBLICATIONS

Maravall, Augustin, "Unobserved Components in Economic Time Series" from Handbook of Applied Econometrics, 1995, Blackwell Publishers Ltd, pp. 12-72.*
Leszczyc, Peter; Bass, Frank M, "Determining the Effects of Observed and Unobserved Heterogenity on Consumer Brand Choice", 1998, John Wiley & Sons, pp. 1-115.*
Nerlove, Marc; Grether, David M.; Carvalho, Jose' L.; "Analysis of Economic Time Series", 1995, Academic Press, pp. 105-119, 261-290.*
Dilger, Karen Abramic, "Predictive Prowess", Jan. 1998, Manufacturing Systems, v16n1, pp. 40-50.*
Allenby, Greg M.; Rossi, Peter E., "Marketing Models of consumer heterogeneity", 1999, Elsevier Science S.A., pp. 1-78.*

(Continued)

Primary Examiner—Susanna M. Diaz
Assistant Examiner—Jonathan G Sterrett
(74) Attorney, Agent, or Firm—Brian E. Harris; James E. Walton

(57) ABSTRACT

Within each iteration of an iterative process: (1) a low-pass filter is applied to an actual sales volumes series to extract low frequency components representing a base sales volume series for the iteration; and (2) a locally optimal base sales volume series is determined. A globally optimal base sales volume series is selected from among the locally optimal base sales volume series, comprising an estimated base sales volume for each time period. One or more of the estimated base sales volumes is made available for use in connection with at least one business analysis.

40 Claims, 3 Drawing Sheets

OTHER PUBLICATIONS

Manchanda, Puneet; Ansari, Asim; Gupta, Sunil, "The 'Shopping Basket': A Model for Multicategory Purchase Decisions", 1999, Marketing Science, vol. 18, No. 2, pp. 95-114.*

Subrahmanyan, Saroja; Shoemaker, Robert, "Developing Optimal Pricing and Inventory Policies for Retailers who face Uncertain Demand", 1996, Journal of Retailing, vol. 72, No. 1, pp. 7-30.*

Web.archive.org, SAS.com webpages of Jun. 25, 1998 "Data Mining—description", "SAS/STAT Software", "Database Marketing".*

* cited by examiner

ESTIMATING BASE SALES VOLUME USING A LOW-PASS FILTER APPROACH

TECHNICAL FIELD OF THE INVENTION

This invention relates generally to business analysis and more particularly to estimating base sales volume using a low-pass filter approach.

BACKGROUND OF THE INVENTION

Business analyses concerning products or other items are fundamental tasks for many manufacturers, suppliers, retailers, and other enterprises. Many business analyses are based on base sales volume. For example, demand forecasting, price-demand-behavior analysis, and promotional effectiveness analysis all rely on sound base sales volume measurement. Base sales volume (sometimes referred to as base volume in the remainder of this application) for consumer packed goods (CPG) is typically defined as the portion of the sales volume that would be expected without advertising or other promotional support. In many business analyses, base volume may be used as a de-causalized factor, such that a small difference in base volume may cause large deviations in the consequent analysis. Many business analyses are frustrated by such propagation of errors in base volume estimation.

In general, base volume is an unobserved component of actual sales volume (often referred to as actual volume in the remainder of this application), which is the observed or recorded sales volume. Ideally, one could determine true base volume through observation, the accuracy being limited only by the observational error. In practice, however, one can only observe the actual volume—the true base volume cannot be directly observed. It is not difficult to show that any estimate of the true base volume based on the observed actual volume and a Lyapunov error function (estimation criteria) will be biased. For example, the most common approach for determining promotional lifts based on estimated base volume generates incorrectly negatively signed lifts as much as thirty-five percent of the time; that is, determines a negative lift (decreased sales) when the lift should actually be positive (increased sales). In addition, conventional moving average approaches for estimating base volume depend on both the number of leads and/or lags involved and weights associated with the leads and/or lags. The complexity of the resulting space significantly impedes the ability to search for globally optimal solutions, making such approaches inferior.

Many businesses lack suitable approaches for measuring base sales volume, for example, for CPG in the presence of one or more promotional activities. These businesses are therefore unable to fully understand the various demand components for their products, which detracts from their ability to effectively plan and manage important business activities. Furthermore, establishing effective approaches to the complex problem of estimating base volume has become an increasingly important pursuit, from a theoretical perspective, in the academic community. As a result of any of the above or other factors, prior techniques for estimating base volume have been inadequate to meet the needs of many business and other users.

SUMMARY OF THE INVENTION

According to the present invention, disadvantages and problems associated with prior techniques for estimating base sales volume are substantially reduced or eliminated.

In one embodiment of the present invention, a method for estimating base sales volume includes accessing an input data series for a series of time periods, the input data for each time period comprising at least an actual sales volume for the time period, the actual sales volumes for the series of time periods collectively comprising an actual sales volume series. Within each iteration of an iterative process: (1) a low-pass filter is applied to the actual sales volumes series in order to extract low frequency components representing a base sales volume series for the iteration; and (2) a locally optimal base sales volume series is then determined for the iteration according to the input data series. A globally optimal base sales volume series is selected from among the locally optimal base sales volume series determined using the iterative process, the globally optimal base sales volume series comprising an estimated base sales volume for each time period. One or more of the estimated base sales volumes is made available for use in connection with at least one business analysis.

The present invention provides a number of important technical advantages over prior techniques. The present invention provides a technique for extraction of unobservable base volume from the actual volume through an iterative process that searches for globally optimal solutions using a low-pass filter approach. Unlike previous techniques that depend on a large number of parameters and make global searching essentially infeasible, the process of the present invention requires only a single smoothing parameter. The present invention also provides improved criteria for selecting an optimal solution, which improves the accuracy of the base volume estimation, particularly in the presence of moderate to high noise. Moreover, lift estimations according to the present invention are much less likely to be incorrectly signed than with previous techniques, for example, approximately ninety-five percent correctly positively signed compared to at most sixty-five percent correctly positively signed using previous techniques. Other important technical advantages are readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
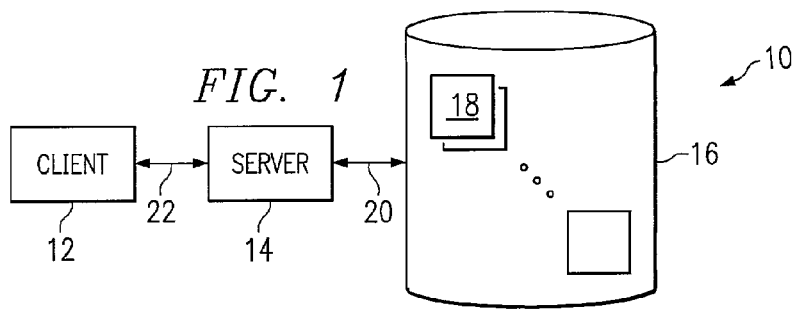
FIG. 1 illustrates an exemplary system for estimating base sales volume using a low-pass filter approach.

FIG. 1 illustrates an exemplary system 10 for estimating the base sales volume using a low-pass filter approach. Although CPG or other suitable products are primarily referred to within this document, the present invention contemplates system 10 estimating base volume for suitable tangible or non-tangible items other than products, including but not limited to services or other benefits. A particular application of the present invention is promotional planning, which may involve at least in part the calculation of promotional "lifts" (increased sales volume resulting from a promotional tactic), in view of any price change, for each promotional tactic being evaluated. However, the present invention may be similarly applied to any other business analysis that depends on the estimated base volume as input. Such analyses may include, for example only and without limitation, demand forecasting, optimal mark down scheduling, complement analysis, and cannibalization analysis.

System 10 includes client 12, server 14, and a database 16. Client 12 may include one or more processes to provide appropriate administration, analysis, and planning input. Although these processes are preferably separate processes running on a dedicated client processor, the present invention contemplates these processes being integrated, in whole or in part, and running on one or more processors within the same or different computers. Similarly, the server 14 may include one or more processes to receive administration, analysis, and planning input from client 12 and interact with database 16 to provide corresponding output to client 12. Although the processes are preferably separate processes running on a dedicated server processor, the present invention contemplates these processes being integrated, in whole or in part, and running on one or more processors within the same or different computers. Client 12 and server 14 may be fully autonomous or may operate at least in part subject to input from users of system 10.

Database 16 provides persistent data storage for system 10. While the term "database" is primarily used, a memory or other suitable data storage arrangement may provide the functionality of database 16 without departing from the intended scope of the present invention. In one embodiment, database 16 is hierarchical and multi-dimensional in nature. In a particular embodiment, the database 16 is three-dimensional and associates with each storage location 18 a particular member of a product dimension, a particular member of a geography dimension, and a particular member of a time dimension. Within database 16, each combination of members of these dimensions is associated with a corresponding storage location 18, similar to each combination of coordinates from the x-, y-, and z-axes being associated with a point in three-dimensional Euclidean space. Furthermore, position in a particular dimension may be changed independent of members of other dimensions, like the position of a coordinate along the x-axis may be changed independent of the positions of other coordinates along the y- and z-axes in three-dimensional Euclidean space. The values of one or more data measures for a particular combination of members from the various dimensions of the database 16 are stored in the particular storage location 18 for that combination of members.

The data measures associated with database 16 may include estimated base volume and data measures from which the base volume is derived according to the present invention. In one embodiment, the other data measures may include actual volume, incremental price reduction, one or more promotion variables, or any other appropriate data measures. Actual volume may be defined as the total volume sold over a specified time period, expressed in suitable units (e.g., units, cases, pounds, etc.). Incremental price reduction may be defined as incremental price reduction, expressed as a percentage of a base price or otherwise, as a result of one or more promotional tactics during a specified time period. Promotion variables may reflect promotional tactics that occur during a specified time period (usually expressed in a binary format) or the relative weights to be accorded those tactics. For example, promotion variables may reflect a temporary price reduction, insert, display, or any other suitable promotional tactic. If the tactic occurred during the time period in question, the value of the variable might equal one, otherwise the value might equal zero. The value of a promotion variable might instead be a weight, for example, to reflect a percentage of all commodity volume (% ACV), where ACV quantifies the size of a store, chain, market, region, country, or the like in terms of the total sales. As a particular example, temporary price reduction % ACV might be a promotion variable reflecting the percentage of the total sales for all stores that occur at stores which participated in some temporary price reduction promotional tactic during the specified time period.

The present invention contemplates database 16 having as few or as many dimensions as are appropriate in a particular case. For example, and not by way of limitation, an enterprise associated with system 10 may not consider geography in connection with its base volume estimation needs. This might be the case where products are ordered using the Internet or the telephone and then distributed from a single distribution point. In this example, the database 16 may be two-dimensional rather than three-dimensional and may not reflect positions or members within the geography dimension. In another case, the values for base volume may inherently reflect a time interval, in which case the database 16 may be two-dimensional and may not reflect positions or members within the time dimension. Other scenarios involving more or fewer than three dimensions will be readily apparent to those of skill in the art. The present invention contemplates database 16 having any suitable dimensions, according to the needs of the enterprise associated with system 10 and constraints associated with the particular scenario.

In the three-dimensional embodiment of the present invention, the values of the data measures within the set for a particular storage location 18 depend on the combined positions of members within product, geography, and time dimensions for that storage location 18. As a result, the values of the data measures typically vary with these combined positions as appropriate to accurately reflect the actual volume, incremental price reduction, promotion variables, or other data associated with the combination of members. As described below, when a combination of members is specified in the product, geography, and time dimensions according to operation of system 10, the database 16 accesses the values of the data measures for the storage location 18 associated with that combination of members for use in estimating base volume for that combination of members.

In one embodiment, the database 16 supports on-line analytical processing (OLAP) capability and is populated with data measures received from one or more transactional data sources that are internal, external, or both internal and external to the enterprise or facility associated with the system 10. For example and without limitation, data received from such sources may include, as described above, actual volume, incremental price reduction, promotion variables, or any other appropriate information that is applicable to estimation of base volume. The present invention contemplates data being stored in the database 16 by server 14 based on input from client 12 or in any other suitable manner.

Server 14 is coupled to database 16 using link 20, which may include any wireline, wireless, or other links suitable to support communications between server 14 and database 16 during operation of system 10. Database 16 may be integral to or separate from server 12, may operate on one or more computers, and may store any information suitable to support the operation of system 10 in estimating base volume according to the present invention. Client 12 is coupled to server 14 using link 22, which may include any wireline, wireless, or other links supporting communications between client 12, server 14, and the processes of client 12 and server 14 during operation of system 10. Although link 22 is shown generally coupling client 12 to server 14, the processes of server 12 may communicate directly with corresponding processes of client 14 according to particular needs.

In one embodiment, an administrator process of server 14 may communicate with an administrator process of the client 12 to interact with an associated user in managing database 16 and at least some activities associated with the database 16. The administrator server process may accept user or other suitable input to define relationships, such as parent-child relationships, between the members of a single dimension and between storage locations 18 that are each associated with multiple dimensions within database 16. The administrator server process may also accept user or other input to define the variation in time of the values of the data measures associated with a particular member. The administrator server process may store member relationships and variability data within database 16 in any suitable format for use in estimating base volume according to the present invention.

An analyzer process of server 14 may communicate with an analyzer process of client 12 to access some or all of the contents of database 16 for analysis and reporting purposes. For example, the analyzer server process may provide analyzer client process read only access to database 16, such that analyzer client process may not modify the contents of database 16.

A planner process of server 14 may communicate with a planner process of client 12 to allow client 12 or one or more associated users to store information in database 16 and modify the contents of database 16 for purposes of estimating base volume. For example, the planner server process may participate in the storage and manipulation of data expressions and relationships that are used in estimating base volume according to the present invention. The planner server process may also participate in modifying appropriate contents of database 16.

As described briefly above, client 12, server 14, and database 16 may each operate on one or more computers. Each computer may include one or more input devices, such as a keypad, mouse, touch screen, microphone, or other device that receives information. Each computer may include an output device that conveys information associated with the operation of system 10, including digital or analog data, visual information, or audio information. Each computer may include fixed or removable storage media, such as a magnetic hard disk, CD-ROM, or other suitable storage media. Each computer may include one or more processors and associated memory to execute instructions and manipulate information during the operation of system 10. Where multiple computers support client 12, server 14, and database 16, these computers may share one or more resources as appropriate. Each of these one or more computers 34 may be a work station, personal computer, network computer, personal digital assistant, wireless telephone, or any other suitable computing device according to particular needs.

Figure 2:
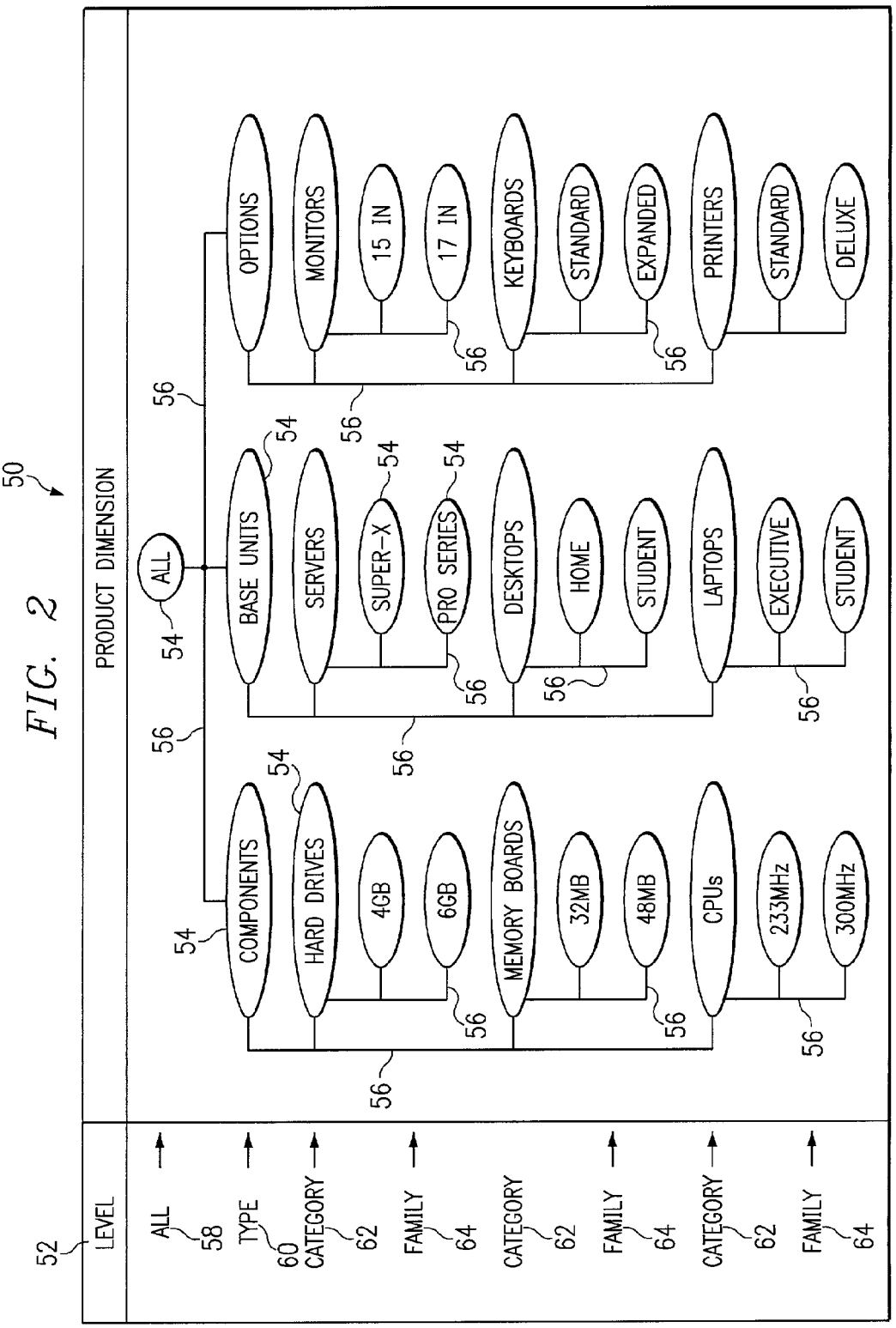
FIG. 2 illustrates an exemplary product dimension within a multi-dimensional database.

FIG. 2 illustrates an exemplary product dimension 50 within database 16 that includes a hierarchy of product levels 52 each having one or more members 54. The value of each data measure associated with a member 54 is an aggregation of the values of corresponding data measures associated with hierarchically related members 54 in lower levels 52 of product dimension 50. In an exemplary embodiment in which system 10 provides estimated base volume, the base volume associated with a member 54 is the aggregate estimated base volume for these hierarchically related members 54 in the lower levels 52 of the product dimension 50. In the illustrated embodiment, the product levels 52 for product dimension 50 include an all products level 58, a product type level 60, a product category level 62, and a product family level 64. Selected exemplary hierarchical relationships between members 54 are shown using links 56, as described below. Links 56 between hierarchically related members 54 in adjacent levels 52 of the product dimension 50 reflect parent-child relationships between members 54. Although FIG. 2 is described primarily in connection with estimated base volume relationships, the following description is similarly applicable to other relationships for other data measures, such as actual volume, incremental price reduction, promotion variables, or any other appropriate data measures.

In the particular example shown in FIG. 2, all products level 58 contains "All" member 54 representing the aggregate demand for all members 54 in lower levels 60, 62, and 64 of product dimension 50. Product type level 60 contains "Components," "Base Units," and "Options" members 54. "Components" member 54 represents the aggregate base volume for hierarchically related members 54 below "Components" member 54 in levels 62 and 64 of product dimension 50. Similarly, "Base Units" member 54 represents the aggregate base volume for hierarchically related members 54 below "Base Units" member 54 and the "Options" member 54 represents the aggregate base volume for hierarchically related members 54 below "Options" member 54. Links 56 between "All" member 54 and "Components," "Base Units," and "Options" members 54 indicate the hierarchical relationships between these members 54.

Product category level 62 contains, under "Components" member 54, "Hard Drives," "Memory Boards," and "CPUs" members 54. "Hard Drives" member 54 represents the aggregate base volume for hierarchically related members 54 below "Hard Drives" member 54 in level 64 of product dimension 50. Similarly, "Memory Boards" member 54 represents the aggregate base volume for hierarchically related members 54 below "Memory Boards" member 54 and "CPUs" member 54 represents the aggregate base volume for hierarchically related members 54 below the "CPUs" member 54. The links 56 between "Components" member 54 and "Hard Drives," "Memory Boards," and "CPUs" members 54 indicate the hierarchical relationships between these members 54. Analogous links 56 reflect hierarchical relationships between "Base Units" and "Options" members 54 of the product type level 60 and corresponding members 54 in lower levels 62 and 64 of product dimension 50.

Product family level 64 contains, under "Hard Drives" member 54, "4 GB" and "6 GB" members 54. Links 56 between "Hard Drives" member 54 and "4 GB" and "6 GB" members 54 indicate hierarchical relationships between these members 54. Analogous links 56 reflect hierarchical relationships between "Memory Boards," "CPUs," "Servers," "Desktops," "Laptops," "Monitors," "Keyboards," and "Printers" members 54 of product category level 62 and corresponding members 54 in lower level 64 within product dimension 50. Although no links 56 are shown between members 54 in product family level 64 and possible lower levels 52, the present invention contemplates further levels 52 existing within product dimension 50 and analogous links 56 to reflect corresponding hierarchical relationships. Furthermore, members 54 shown in FIG. 2 are exemplary only and are not intended to be an exhaustive set of all the possible members 54. Those skilled in the art will readily appreciate that other suitable members 54 and associated links 56 may exist without departing from the intended scope of the present invention.

Figure 3:
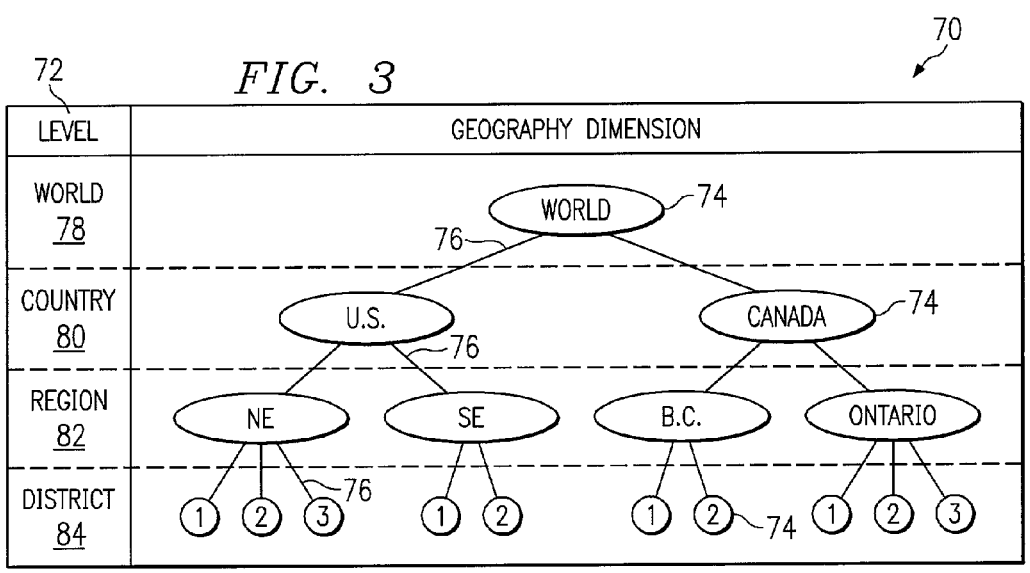
FIG. 3 illustrates an exemplary geography dimension within a multi-dimensional database.

FIG. 3 illustrates an exemplary geography dimension 70 within database 16 that includes a hierarchy of geography levels 72 each with one or more members 74. The value of each data measure associated with a member 74 is an aggregation of the values of corresponding data measures associated with the hierarchically related members 74 in lower levels 72 of the geography dimension 70. In the exemplary embodiment in which system 10 provides estimated base volume, the base volume associated with a member 74 is the aggregate base volume for these hierarchically related members 74. In this embodiment, geography levels 72 for the geography dimension 70 include a world level 78, a country level 80, a region level 82, and a district level 84. Selected and merely exemplary hierarchical relationships between members 74 are shown using links 76, which are analogous to links 56 described above with reference to FIG. 2. Although FIG. 3 is described primarily in connection with estimated base volume relationships, the following description is similarly applicable to other relationships for other data measures, such as actual volume, percentage price reduction, promotional variables, or any other appropriate data measures.

In the particular example illustrated in FIG. 3, world level 78 contains "World" member 74 representing aggregate worldwide base volume. Country level 80 contains "U.S." and "Canada" members 74, which represent the aggregate base volume for the United States and Canada, respectively. Link 76 between "U.S." members 74 in the country level 80 and "World" members 74 in the world level 78 indicates a hierarchical relationship between these members 74. Similarly, link 76 between "Canada" member 74 and "World" member 74 indicates the hierarchical relationship between these members 74. In this example, worldwide base volume is an aggregation of aggregate base volume in the United States as well as aggregate base volume in Canada. Although other links 76 are not described in detail, those skilled in the art will appreciate that links 76 are analogous to links 56 described above with reference to FIG. 2 in that each link 56 represents a corresponding hierarchical relationship between members 74 in various levels 72 of geography dimension 70. As described above, the present invention contemplates eliminating or otherwise not considering geography dimension 70 in estimating base volume, for example, if geography dimension 70 is not relevant to particular needs. Database 16 might in this situation be two-dimensional.

Values for actual volume, incremental price reduction, promotion variables, and any other data measures may be derived using traditional techniques. Deriving values for a particular member 54, 74 may depend on the hierarchical relationships between the particular member 54, 74 and other members 54, 74. As is described above, the values associated with each member 54, 74 are aggregations of values associated with members 54, 74 in lower levels 52, 72 within the same hierarchy of parent-child links 56, 76. Therefore, given a value for a member 54, 74 (a parent) at one level 52, 72, the values for each of the related members 54 in the next lowest level 52, 72 (children of the parent) may be determined by disaggregating the value for the parent between its children. In one embodiment, while the terms "parent" and "children" are used above to identify a relationship between members 54, 74 of a single dimension 50, 70, these terms may also be used to refer to the relationships between values associated with storage locations 18 that are each associated with members from multiple dimensions. For example, a first storage location 18 storing actual volume for a particular product in a particular region may be hierarchically related to a second storage location 18 storing actual volume for the product in one city of that region (the value for the first storage location 18 being a parent of the value for the second storage location 18).

Figure 4:
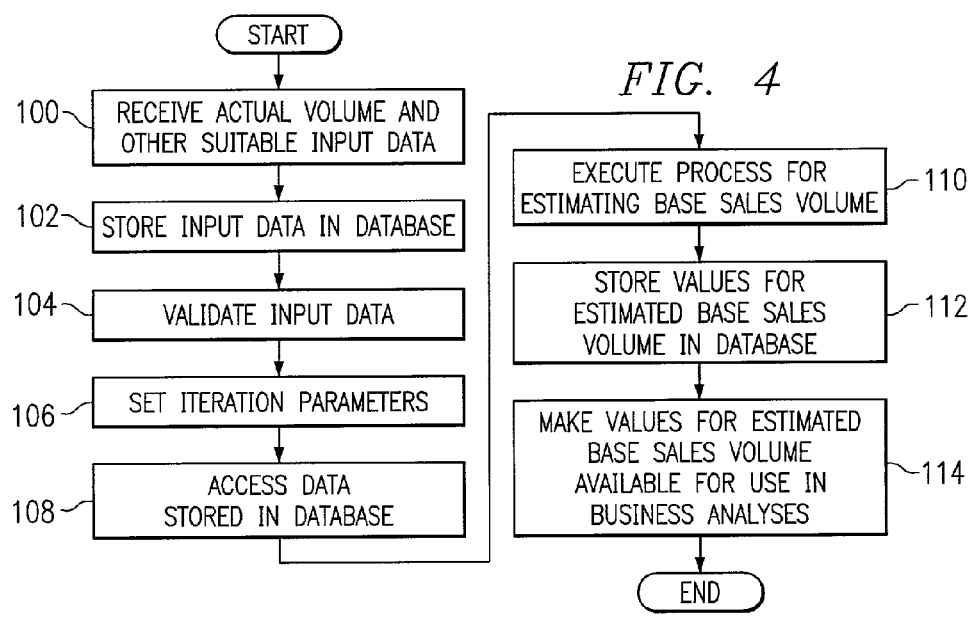
FIG. 4 illustrates an exemplary method for estimating base sales volume.

FIG. 4 illustrates an exemplary method for estimating base sales volume. The method begins at step 100, where server 14 receives actual volume and any other suitable input data. For example, in addition to actual volume data, input data may include data for incremental price reduction, promotion variables, or other suitable data useful in estimating base volume according to the present invention. In one embodiment, input data may be received as an input data series, with input data for each of a succession of time periods, which might be days, weeks, months, or any other appropriate time periods. For example, input data series may include actual volume series, incremental price reduction series, promotion variable series, or any other suitable input data series. Server 14 may receive the input data from client 12 after one or more users or other sources supply the input data to client 12. Server 14 stores the input data in database 16 at step 102.

At step 104, the server 14 may validate the input data for some or all storage locations 18. In one embodiment, this involves validating the input data for each intersection of members in the product and geography dimensions over the series in the time dimension. In a particular embodiment, validation involves determining a number of data points n within the input data series and determining the number of valid independent variables k, such as actual volume, incremental price reduction, and promotion variables. For example, an independent variable may be considered valid if the number of non-zero values in the time series for the independent variable is greater than one. Server 14 may keep all input data series in their entirety for the intersections at issue, for example, where n≧k+5. Otherwise, portions of one or more such series may be discarded or otherwise ignored for purposes of estimating base volume. Although a particular validation technique is described, any suitable validation technique or no validation technique may be used according to particular needs.

In general, the present invention applies a low-pass filter to the actual volume series for a particular intersection to extract the lower frequency components which represent a base volume series. The low-pass filter may be obtained as the solution to the following minimization problem:

$$\min_{\{s_t\}_{t=0}^{T+1}} \sum_{t=1}^{T} \{[(y_t - s_t)^2 + \lambda[(s_{t+1} - s_t) - (s_t - s_{t-1})]^2\} \tag{1}$$

where $y_t$ is an observed time series (usually non-stationary), $s_t$ is a lower frequency component, and $\lambda$ is a smoothing parameter with range [0, +∞).

The closed form solution of problem (1) can be expressed as:

$$LF = (\lambda \cdot P + U)^{-1} \quad (2)$$

where U is an identity matrix of dimension n (the number of observed data points in the time series) and P is a Toeplitz matrix. To more fully understand the use of low-pass filtering in this context, consider the limiting version of the first order closed form solution to problem (1):

$$LF = [1 + \lambda(1-B)^2(1-B^{-1})^2]^{-1} \quad (3)$$

where B is backward operator.

The Fourier transform of this filter has a particularly simple form:

$$LF(\omega) = \frac{1}{1 + 4\lambda[1 - \cos(\omega)]^2}. \quad (4)$$

Thus, the filter assigns a weight of approximately one at frequencies close to zero (since $\cos(0)=1$) and assigns a weight of approximately zero at higher frequencies (since $\cos(\pi))=-1$ implies that $LF(\pi)=1/(1+16\lambda)$, which is approximately zero for a large value of $\lambda$).

The bandwidth of this filter, and therefore its ability to filter out the higher frequency components, depends only on the value of the smoothing parameter, $\lambda$. Larger values of $\lambda$ penalize changes in the low-pass component and result in a smoother low-pass component. The reliance on a single parameter, $\lambda$, as opposed to a very large number of time and/or weight parameters as in previous techniques, significantly reduces the complexity of the problem space. This makes searches for globally optimal solutions feasible and provides an important technical advantage over such previous techniques.

At step 106, based on input from client 12 or otherwise, server 14 sets the number I of values of the smoothing parameter $\lambda$ that are to be iterated over when searching for global optima, and sets the number J of iterations that are to occur for each $\lambda$ in searching for local optima. I and J are referred to for purposes of this document as iteration parameters. In general, I and J may be any suitable integers. However, to achieve a suitable balance of accuracy and computational speed, in a preferred embodiment server 14 sets I=5 and J=3. Letting $\lambda(i)$ $10^{i-1}$, equation (2) can be rewritten as:

$$LF = (10^{i-1} \cdot P + U)^{-1}. \quad (5)$$

In a case in which I=5, $\lambda(i)=10^{i-1}=10,000$, such that 10,000 values of $\lambda$ must be iterated over.

Server 14 accesses input data series stored within the database 16 at step 108 and, at step 110, executes a process for estimating base volume that implements the low-pass filter approach described above. This process is described in further detail below with reference to FIG. 5. After server 14 has selected an estimated base volume series according to this process, server 14 stores the estimated base volume values at the appropriate storage locations 18 within the database 16 at step 112. At step 114, the estimated base volume values may be made available to the server 14, client 12, an associated user, or another suitable entity for use in connection with one or more business analyses, and the method ends.

Figure 5:
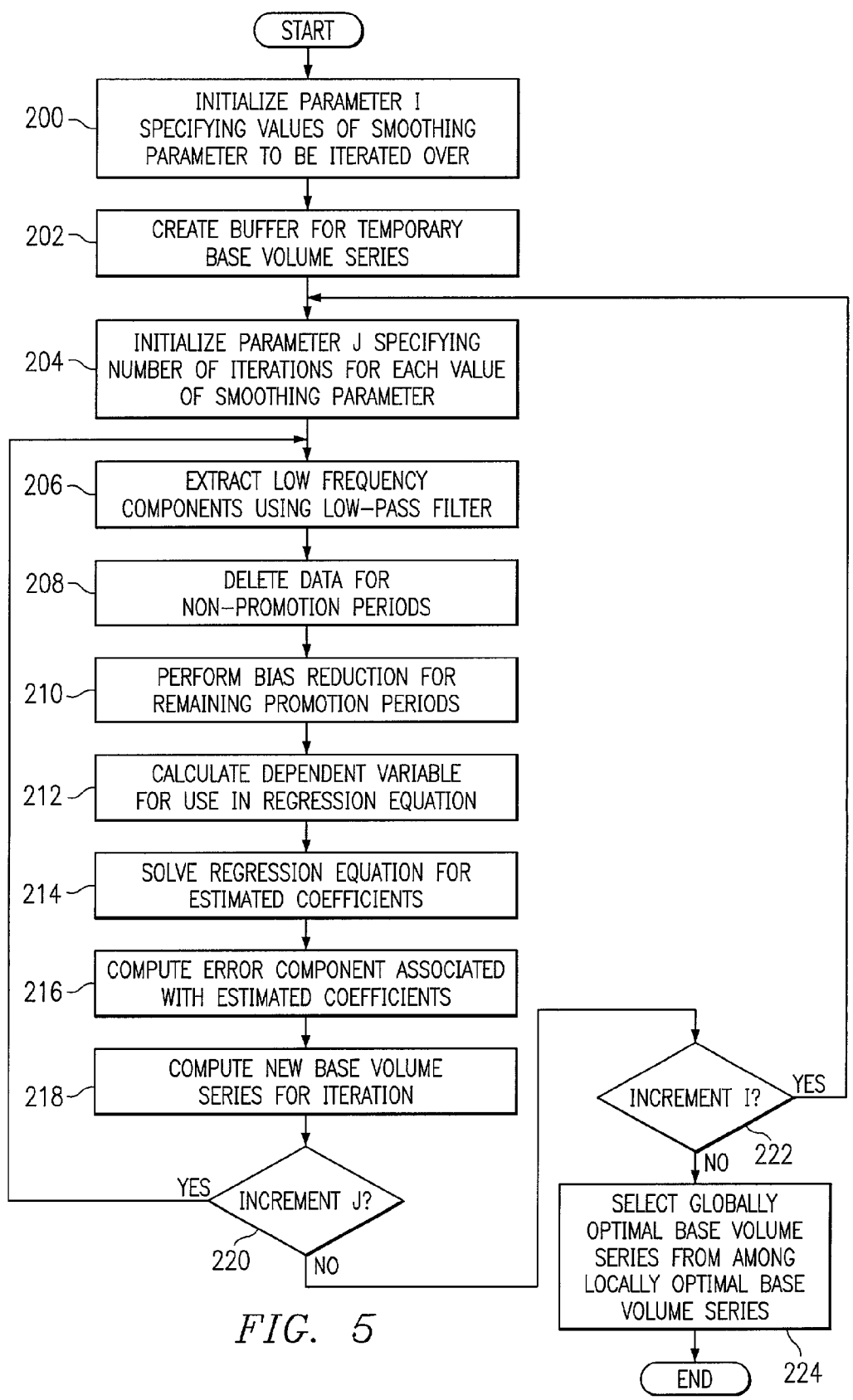
FIG. 5 illustrates an exemplary process for estimating base sales volume using a low-pass filter approach.

FIG. 5 illustrates an exemplary process for estimating base sales volume using a low-pass filter approach, executed at step 110 of FIG. 4 as is described above. Although a particular embodiment of the process will be described, one or more appropriate additions, deletions, or modifications may be made to the process without departing from the intended scope of the present invention.

The method begins at step 200, where server 14 initializes I specifying the values of the smoothing parameter $\lambda$ to be iterated over:

i=1.

In general, as described briefly above, the process iterates over i in searching for a globally optimal base volume series. At step 202, the server 14 creates a buffer to contain the temporary base volume series (TV) that is generated as a result of the calculations made during the iterative process:

TV=AV where AV is the actual volume series. At step 204, server 14 initializes J specifying number of iterations for each $\lambda$:

j=1.

In general, as briefly noted above, the process iterates over j in searching for locally optimal base volume series.

At step 206, server 14 applies an appropriate low-pass filter to extract lower frequency components, as described above:

$BV(i,j)=LF(i)*TV$ i=1,2, . . . , I where BV is the base volume series for this iteration. At step 208, server 14 deletes or otherwise ignores non-promotion periods (keeping only the data for time periods, referred to herein as promotion periods, during which at least one promotional tactic is used). At step 210, server 14 performs bias reduction for the remaining group of promotion periods:

$BV(i,j)=AV$ if $BV(i,j)>AV$ or $BV(i,j) \leq 0$.

This or other bias reduction may be desirable to minimize leakage from the higher frequency components into the lower frequency components.

At step 212, server 14 calculates the value of a dependent variable y:

$$y(i, j) = \ln\left(\frac{AV}{BV(i, j)}\right).$$

This serves as the left-hand side of the regression equation:

$y(i,j) = \alpha + \beta_0 PR + \beta_1 Prom_1 + \ldots + \beta_k Prom_k$ where PR is the incremental price reduction series (independent variable) and each Prom is a corresponding promotion variable series (independent variable). At step 214, server 14 solves the regression equation for the particular values of i,j for the iteration. A solution of the regression equation is a set of estimated coefficients for the independent variables. At step 216, the server 14 computes an error component associated with use of these estimated coefficients:

$e(i,j)=y(i,j)-\hat{y}(i,j)=y(i,j)-\hat{\alpha}-\hat{\beta}_0 PR-\hat{\beta}_1 Prom_1 - \ldots - \hat{\beta}_k Prom_k$.

In one embodiment, at least approximately sixty-five percent (and preferably approximately ninety-five percent) of the estimated coefficients generated according to the present invention are correctly positively signed (indicating a sales increase when an increase should in fact occur).

At step 218, server 14 computes a new base volume series for the iteration:

$$nBV = \frac{AV}{\exp(e(i,j))}.$$

where nBV is the new base volume series recovered. For each of the data points l in this series:
  If $nBV > BV_1(i,j)$, then $nBV = BV_1(i,j)$ (for additional bias reduction), else leave nBV as is (no bias reduction needed);
  TV=nBV;
  If at step 220 j<J set j=j+1, go to step 206, else go to step 222;
  If at step 222 j=J and i<I set i=i+1, go to step 204, else go to step 224.

At step 224, server 14 selects the globally optimal base volume series, BV*, from among the locally optimal base volume series (determined by iterating through all i,j) according to the following selection criteria:
  If not all $\hat{\beta}_0(i,j) < 0$ then BV*=BV(l,m) such that $$R^2(l,m) = \max_{i,j}\{R^2(i,j) \mid \forall\, \hat{\beta}_0(i,j) > 0\};$$

If all $\hat{\beta}_0(i,j) < 0$ then BV*=BV(l,m) such that $$\hat{\beta}_0(l,m) = \max_{i,j}\{\hat{\beta}_0(i,j) \mid \forall\, R^2(i,j) > r\}.$$

where $R^2$ reflects, statistically, the "closeness" of the fit between the series of actual values y(i,j) and estimated values ŷ(i,j), and r is a variable whose value is selected as an acceptable minimum value of $R^2$ according to particular business needs. In a particular embodiment, r is equal to 0.2. In essence, the first criterion eliminates base volume series with negative values for the estimated coefficient for the incremental price reduction series, $\hat{\beta}_0$. Then, for the remaining base volume series (all having positive values of $\hat{\beta}_0$), the first criterion selects the base volume series with the value of $\hat{\beta}_0$ for which $R^2$ is maximum. In contrast, the second criterion in essence eliminates all base volume series for which $R^{2>0.2}$. Then, from among the remaining base volume series, it selects the base volume series with the value of $\hat{\beta}_0$ that is least negative (closest to zero). These hybrid selection criteria, which rely on a combination of sign-check rules and $R^2$ statistical rules, provide an important technical advantage over model selection criteria that rely entirely on $R^2$ statistical rules and are thus more likely to provide incorrect results in the presence of moderate to high noise.

The globally optimal base volume series, BV*, is the estimated base volume series that may be used in connection with one or more business analyses. Once the values for estimated base volume have been determined, this process ends and the method of FIG. 4 continues.

Although the present invention has been described with several embodiments, a plurality of changes, substitutions, variations, alterations, and modifications may be suggested to one skilled in the art, and it is intended that the invention encompass all such changes, substitutions, variations, alterations, and modifications as fall within the spirit and scope of the appended claims.

The invention claimed is:

1. A computer-implemented method for estimating base sales volume, the method being performed using one or more processing units, the method comprising:
  using one or more processing units, accessing an input data series for a series of time periods, the input data for each time period comprising at least an actual sales volume for the time period, the actual sales volumes for the series of time periods collectively comprising an actual sales volume series;
  within each iteration of an iterative process, wherein the iterative process involves a nonlinear regression process:
    using one or more processing units, applying a low-pass filter to the actual sales volumes series to extract low frequency components representing a base sales volume series for the iteration;
    using one or more processing units, determining a locally optimal base sales volume series for the iteration according to the input data series;
  using one or more processing units, selecting a globally optimal base sales volume series from among the locally optimal base sales volume series determined using the iterative process, the globally optimal base sales volume series comprising an estimated base sales volume for each time period; and
  using one or more processing units, making one or more of the estimated base sales volumes available for use in connection with at least one business analysis,
  wherein determining the locally optimal base sales volume series for an iteration comprises:
    solving a regression equation to determine values for estimated coefficients associated with an incremental price reduction series and one or more promotion variable series;
    computing an error associated with use of the estimated coefficients; and
    to reduce bias, considering the error in selecting the locally optimal base sales volume series.

2. The method of claim 1, wherein the iterative process is performed according to a smoothing parameter that is independent of time periods associated with the input data series.

3. The method of claim 1, wherein:
  a first parameter specifies the number of values the smoothing parameter can have, an iterative loop being performed within the iterative process for each value of the smoothing parameter; and
  a second parameter specifies the number of iterations to be performed, inside the iterative loop, for each value of the smoothing parameter.

4. The method of claim 3, wherein the smoothing parameter will have approximately ten thousand values according to the first parameter and, according to the second parameter, approximately three iterations will be performed inside the iterative loop for each value of the smoothing parameter.

5. The method of claim 1, wherein:
  the input data series is stored in a multi-dimensional database comprising at least product, geography, and time dimensions; and
  each input data value in the input data series is associated with a particular intersection of members within the product, geography, and time dimensions.

6. The method of claim 1, wherein the input data for each time period further comprises:
  an incremental price reduction value associated with one or more promotional tactics conducted in the time period, the incremental price reduction values for the time periods collectively comprising an incremental price reduction series; and values for one or more promotion variables that reflect whether associated promotional tactics are conducted during the time period or reflect relative weights accorded associated promotional tactics conducted during the time period, the values for each promotion variable collectively comprising a promotion variable series for that promotion variable, one or more of these promotional tactics selected from the group consisting of:

a temporary price reduction for the item;
a promotional insert packaged with the item;
a promotional display for the item; and
an advertisement for the item.

7. The method of claim 1, wherein the regression equation involves the actual sales volume series, the base sales volume series resulting from application of the low-pass filter, the incremental price reduction series, and the one or more promotion variable series.

8. The method of claim 7, wherein selecting the globally optimal base sales volume series comprises:

eliminating all the locally optimal base sales volume series having negative values for the estimated coefficient for the incremental price reduction series; and of the remaining locally optimal base sales volume series, selecting the locally optimal base sales volume series for which an $R^2$ statistical measure has a maximum value.

9. The method of claim 7, wherein selecting the globally optimal base sales volume series comprises:

eliminating all the locally optimal base sales volume series for which an $R^2$ statistical measure has a value less than approximately 0.2; and of the remaining locally optimal base sales volume series, selecting the locally optimal base sales volume series having the estimated coefficient for the incremental price reduction series with least negative value.

10. The method of claim 7, wherein less than approximately thirty-five percent of the values of the estimated coefficients have incorrect signs indicating a decrease in base sales volume when in reality an increase should occur.

11. The method of claim 7, wherein approximately ninety-five percent of the values of the estimated coefficients have correct signs indicating an increase in base sales volume when in reality an increase should occur.

12. The method of claim 1, wherein the business analysis comprises the calculation of increased sales volume associated with a promotional tactic based on one or more estimated base sales volumes.

13. The method of claim 1, wherein the business analysis is selected from the group consisting of:

promotional planning;
demand forecasting;
optimal mark down scheduling;
complement analysis; and
cannibalization analysis.

14. A system for estimating base sales volume, comprising:

a database operable to store an input data series for a series of time periods, the input data for each time period comprising at least an actual sales volume for the time period, the actual sales volumes for the series of time periods collectively comprising an actual sales volume series;

one or more processors collectively operable to:

access the input data series;
within each iteration of an iterative process that involves a nonlinear regression process:
apply a low-pass filter to the actual sales volumes series to extract low frequency components representing a base sales volume series for the iteration;
determine a locally optimal base sales volume series for the iteration according to the input data series;
select a globally optimal base sales volume series from among the locally optimal base sales volume series determined using the iterative process, the globally optimal base sales volume series comprising an estimated base sales volume for each time period; and
make one or more of the estimated base sales volumes available for use in connection with at least one business analysis, wherein determining the locally optimal base sales volume series for an iteration comprises:

solving a regression equation to determine values for estimated coefficients associated with an incremental price reduction series and one or more promotion variable series;

computing an error associated with use of the estimated coefficients; and to reduce bias, considering the error in selecting the locally optimal base sales volume series.

15. The system of claim 14, wherein the processor performs the iterative process according to a smoothing parameter which is independent of time periods associated with the input data series.

16. The system of claim 14, wherein:

a first parameter specifies the number of values the smoothing parameter can have, an iterative loop being performed within the iterative process for each value of the smoothing parameter; and a second parameter specifies the number of iterations to be performed, inside the iterative loop, for each value of the smoothing parameter.

17. The system of claim 16, wherein the smoothing parameter will have approximately ten thousand values according to the first parameter and, according to the second parameter, approximately three iterations will be performed inside the iterative loop for each value of the smoothing parameter.

18. The system of claim 14, wherein:

the database is multi-dimensional and comprises at least product, geography, and time dimensions; and each input data value in the input data series is associated with a particular intersection of members within the product, geography, and time dimensions.

19. The system of claim 14, wherein the input data for each time period further comprises:

an incremental price reduction value associated with one or more promotional tactics conducted in the time period, the incremental price reduction values for the time periods collectively comprising an incremental price reduction series; and values for one or more promotion variables that reflect whether associated promotional tactics are conducted during the time period or reflect relative weights accorded associated promotional tactics conducted during the time period, the values for each promotion variable collectively comprising a promotion variable series for that promotion variable, one or more of these promotional tactics selected from the group consisting of:
a temporary price reduction for the item;
a promotional insert packaged with the item;
a promotional display for the item; and
an advertisement for the item.

20. The system of claim 14, wherein the regression equation involves the actual sales volume series, the base sales volume series resulting from application of the low-pass filter, the incremental price reduction series, and the one or more promotion variable series.

21. The system of claim 20, wherein selecting the globally optimal base sales volume series comprises:
eliminating all the locally optimal base sales volume series having negative values for the estimated coefficient for the incremental price reduction series; and
of the remaining locally optimal base sales volume series, selecting the locally optimal base sales volume series for which an $R^2$ statistical measure has a maximum value.

22. The system of claim 20, wherein selecting the globally optimal base sales volume series comprises:
eliminating all the locally optimal base sales volume series for which an $R^2$ statistical measure has a value less than approximately 0.2; and
of the remaining locally optimal base sales volume series, selecting the locally optimal base sales volume series having the estimated coefficient for the incremental price reduction series with least negative value.

23. The system of claim 20, wherein less than approximately thirty-five percent of the values of the estimated coefficients have incorrect signs indicating a decrease in base sales volume when in reality an increase should occur.

24. The system of claim 20, wherein approximately ninety-five percent of the values of the estimated coefficients have correct signs indicating an increase in base sales volume when in reality an increase should occur.

25. The system of claim 14, wherein the business analysis comprises the calculation of increased sales volume associated with a promotional tactic based on one or more estimated base sales volumes.

26. The system of claim 14, herein the business analysis is selected from the group consisting of:
promotional planning;
demand forecasting;
optimal mark down scheduling;
complement analysis; and
cannibalization analysis.

27. Software for estimating base sales volume, the software embodied in a computer-readable medium and when executed by a computer operable to:
access an input data series for a series of time periods, the input data for each time period comprising at least an actual sales volume for the time period, the actual sales volumes for the series of time periods collectively comprising an actual sales volume series;
within each iteration of an iterative process that involves a nonlinear regression process:
apply a low-pass filter to the actual sales volumes series to extract low frequency components representing a base sales volume series for the iteration;
determine a locally optimal base sales volume series for the iteration according to the input data series;
select a globally optimal base sales volume series from among the locally optimal base sales volume series determined using the iterative process, the globally optimal base sales volume series comprising an estimated base sales volume for each time period; and
make one or more of the estimated base sales volumes available for use in connection with at least one business analysis,
wherein determining the locally optimal base sales volume series for an iteration further comprises:
solving a regression equation to determine values for estimated coefficients associated with an incremental price reduction series and one or more promotion variable series;
computing an error associated with use of the estimated coefficients; and
to reduce bias, considering the error in selecting the locally optimal base sales volume series.

28. The software of claim 27, wherein the iterative process is performed according to a smoothing parameter which is independent of time periods associated with the input data series.

29. The software of claim 27, wherein:
a first parameter specifies the number of values the smoothing parameter can have, an iterative loop being performed within the iterative process for each value of the smoothing parameter; and
second parameter specifies the number of iterations to be performed, inside the iterative loop, for each value of the smoothing parameter.

30. The software of claim 29, wherein the smoothing parameter will have approximately ten thousand values according to the first parameter and, according to the second parameter, approximately three iterations will be performed inside the iterative loop for each value of the smoothing parameter.

31. The software of claim 27, wherein:
the input data is stored in a multidimensional database comprising at least product, geography, and time dimensions; and
each input data value in the input data series is associated with a particular intersection of members within the product, geography, and time dimensions.

32. The software of claim 27, wherein the input data for each time period further comprises:
an incremental price reduction value associated with one or more promotional tactics conducted in the time period, the incremental price reduction values for the time periods collectively comprising an incremental price reduction series; and
values for one or more promotion variables that reflect whether associated promotional tactics are conducted during the time period or reflect relative weights accorded associated promotional tactics conducted during the time period, the values for each promotion variable collectively comprising a promotion variable series for that promotion variable, one or more of these promotional tactics selected from the group consisting of:
a temporary price reduction for the item;
a promotional insert packaged with the item;
a promotional display for the item; and
an advertisement for the item.

33. The software of claim 27, wherein the regression equation involves the actual sales volume series, the base sales volume series resulting from application of the low-pass filter, the incremental price reduction series, and the one or more promotion variable series.

34. The software of claim 33, wherein selecting the globally optimal base sales volume series comprises:
  eliminating all the locally optimal base sales volume series having negative values for the estimated coefficient for the incremental price reduction series; and
  of the remaining locally optimal base ales volume series, selecting the locally optimal base sales volume series for which an R statistical measure has a maximum value.

35. The software of claim 33, wherein selecting the globally optimal base sales volume series comprises:
  eliminating all the locally optimal base sales volume series for which an statistical measure has a value less than approximately 0.2; and
  of the remaining locally optimal base sales volume series, selecting the locally optimal base sales volume series having the estimated coefficient for the incremental price reduction series with least negative value.

36. The software of claim 33, wherein less than approximately thirty-five percent of the values of the estimated coefficients have incorrect signs indicating a decrease in base sales volume when in reality an increase should occur.

37. The software of claim 33, wherein approximately ninety-five percent of the values of the estimated coefficients have correct signs indicating an increase in base sales volume when in reality an increase should occur.

38. The software of claim 27, wherein the business analysis comprises the calculation of increased sales volume associated with a promotional tactic based on one or more estimated base sales volumes.

39. The software of claim 27, wherein the business analysis is selected from the group consisting of:
  promotional planning;
  demand forecasting;
  optimal mark down scheduling;
  complement analysis; and
  cannibalization analysis.

40. A system for estimating base sales volume, comprising:
  data storage means for storing an input data series for a series of time periods, the input data for each time period comprising at least an actual sales volume for the time period, the actual sales volumes for the series of time periods collectively comprising an actual sales volume series; and
  processing means for:
    accessing the input data series;
    within each iteration of an iterative process that involves a nonlinear regression process;
      applying a low-pass filter to the actual sales volumes series to extract low frequency components representing a base sales volume series for the iteration;
      determining a locally optimal base sales volume series for the iteration according to the input data series;
    selecting a globally optimal base sales volume series from among the locally optimal base sales volume series determined using the iterative process, the globally optimal base sales volume series comprising an estimated base sales volume for each time period; and
    making one or more of the estimated base sales volumes available for use in connection with at least one business analysis,
  wherein determining the locally optimal base sales volume series for an iteration further comprises:
    solving a regression equation to determine values for estimated coefficients associated with an incremental price reduction series and one or more promotion variable series;
    computing an error associated with use of the estimated coefficients; and
    to reduce bias, considering the error in selecting the locally optimal base sales volume series.

* * * * *